United States Patent [19]

Müller

[11] Patent Number: 4,501,997

[45] Date of Patent: Feb. 26, 1985

[54] MAGNETIZATION FOR BRUSHLESS DIRECT CURRENT OUTER ROTOR MOTOR

[75] Inventor: Rolf Müller, St. Georgen, Fed. Rep. of Germany

[73] Assignee: Papst-Motoren GmbH & Co KG, St. Georgen, Fed. Rep. of Germany

[21] Appl. No.: 457,744

[22] Filed: Jan. 14, 1983

[30] Foreign Application Priority Data

Jan. 18, 1982 [DE] Fed. Rep. of Germany ....... 3201280

[51] Int. Cl.³ .............................................. H02P 6/02
[52] U.S. Cl. .................................... 318/254; 318/138; 318/439
[58] Field of Search ................. 318/138, 254 A, 254, 318/439

[56] References Cited

U.S. PATENT DOCUMENTS

| 3,681,669 | 8/1972 | Ayers | 318/254 A X |
| 4,217,508 | 8/1980 | Uzuka | 310/46 |
| 4,286,184 | 8/1981 | Kögler et al. | 318/254 X |
| 4,430,603 | 2/1984 | Muller | 318/254 |

Primary Examiner—Stanley J. Witkowski
Assistant Examiner—Bentsu Ro
Attorney, Agent, or Firm—Fitch, Even, Tabin & Flannery

[57] ABSTRACT

A brushless direct current outer rotor-type motor having a substantially cylindrical air gap, particularly for driving magnetic storage discs, is provided. The rotor carries a permanent magnetic exciting magnet having at least two pole pairs and a permanent magnetic control magnet. One pole pair of the control magnet is asymmetrically constructed in such a way that the pole of one magnetizing direction is circumferentially shorter than the pole of the other magnetizing direction. The remaining control magnet pole pairs are symmetrical. Also provided are two substantially diametrically facing rotation position detectors cooperating with the control magnet along with an evaluation circuit subject to the action of the output signals thereof. Only one pulse is produced per rotor rotation from the evaluation circuit. The exciting and control magnets are identically magnetized, or the pole interface separating the poles of the asymmetrical pole pair either has an alignment diverging from the remaining pole interfaces or has a step-like or hook-shaped configuration.

8 Claims, 13 Drawing Figures

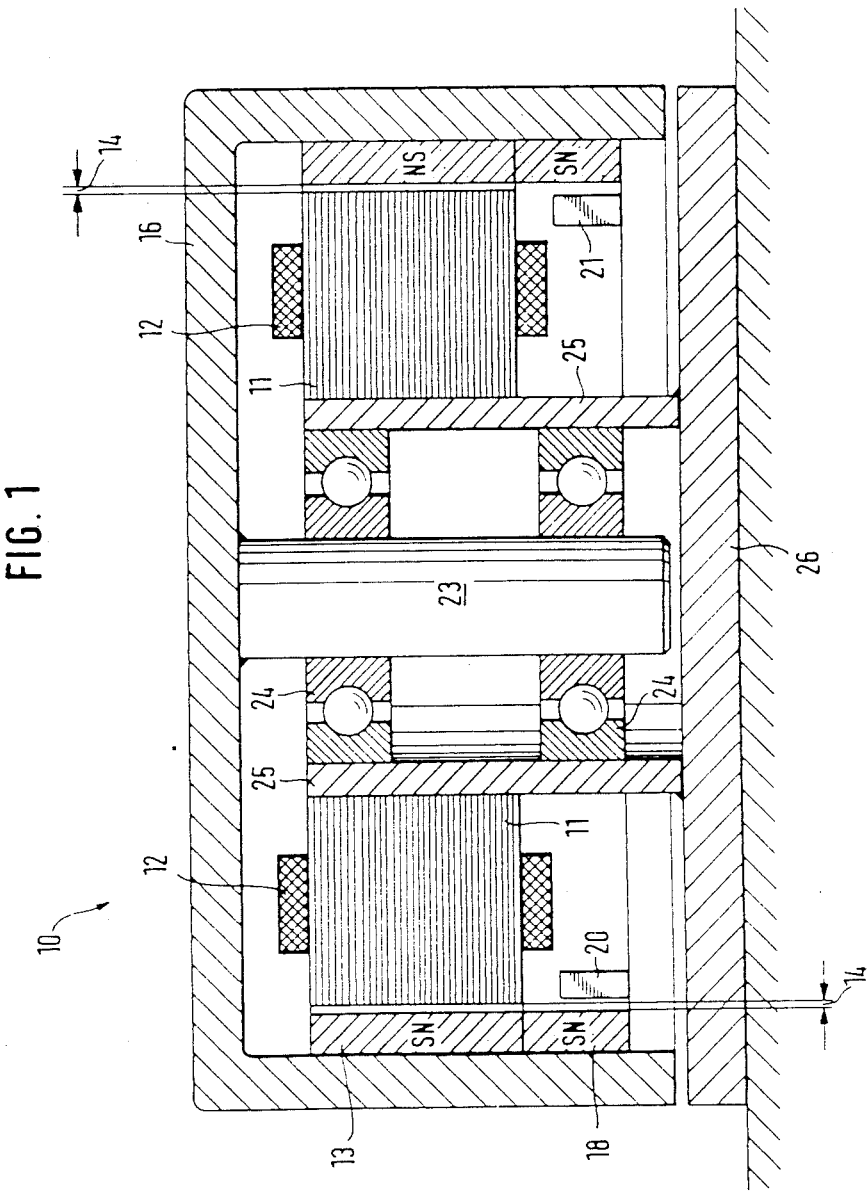

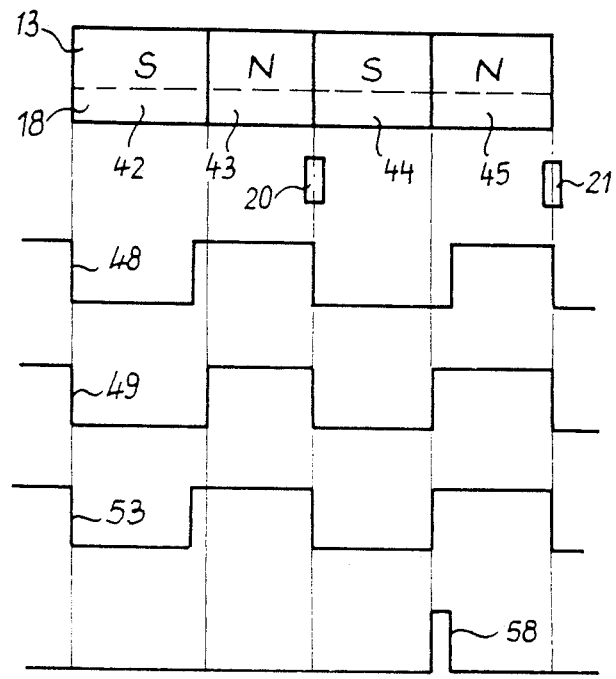
Fig. 2a
Fig. 2b
Fig. 2c
Fig. 2d
Fig. 2e
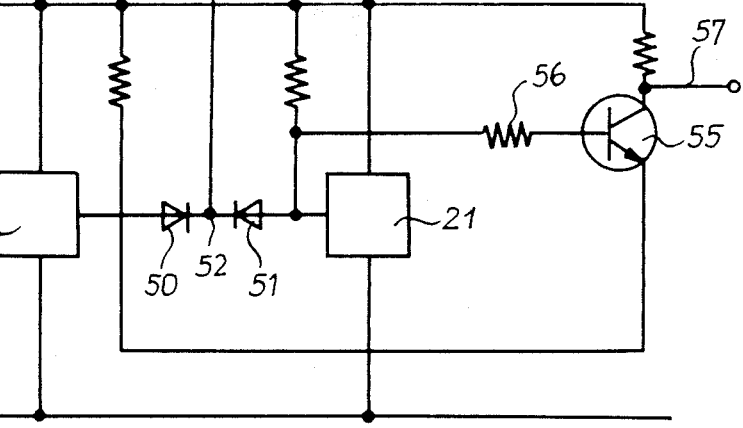
Fig. 3

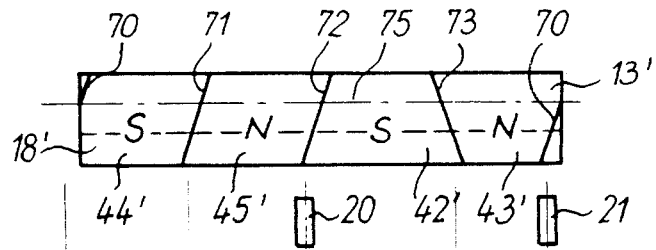
Fig. 4a
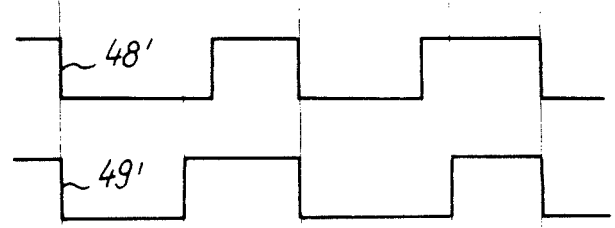
Fig. 4b
Fig. 4c
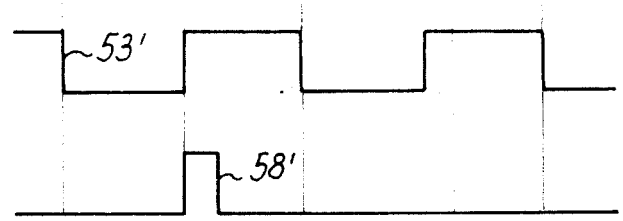
Fig. 4d
Fig. 4e
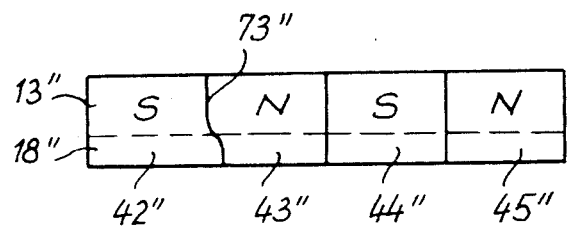
Fig. 5

MAGNETIZATION FOR BRUSHLESS DIRECT CURRENT OUTER ROTOR MOTOR

The invention relates to a brushless direct current outer rotor-type motor having a substantially cylindrical air gap and used particularly for driving magnetic storage discs. The motor includes a rotor carrying a permanent magnetic exciting magnet having at least two pole pairs and a permanent magnetic control magnet. The control magnet has one pole pair constructed asymmetrically such that the pole of one magnetizing direction is circumferentially shorter than the opposite pole, whereas at least the other control magnet pole pairs are symmetrical. Two substantially diametrically facing rotation position detectors produce output signals and cooperate with the control magnet, and an evaluation circuit is responsive to the action of the output signals of the two rotation position detectors and produces only one pulse per rotor rotation. Such is described in copending U.S. application Ser. No. 284,385, filed July 17, 1981, now U.S. Pat. No. 4,430,603.

FIG. 5a of the copending application shows a magnetizing pattern in which the exciting magnet circumferentially includes four equally wide poles of alternately opposite radial magnetizing directions. The control magnet, which is optionally connected to the exciting magnet in one piece, has a pole pair coinciding with one pole pair of the exciting magnet, while the other pole pair of the control magnet has the same combined pole width as the first pole pair, but has a pole of one magnetizing direction that is somewhat wider than the pole of the other magnetizing direction. In practice, the construction of such a magnetizing pattern is difficult, especially if the exciting magnet and control magnet are interconnected in one piece and, for example, comprise a one-part annular magnet or a magnetic strip material bent in annular manner.

The problem of the invention is to further develop the subject matter of the aforementioned U.S. Patent in such a way that the control and exciting magnets can be simply, yet properly magnetized.

According to a first embodiment of the invention, this problem is solved in that the magnetizing of the exciting magnet substantially coincides with the magnetizing of the control magnet, and with respect to the asymmetry of the one pole pair. The asymmetry of one pole pair of the exciting magnet does not impair the power operation of the motor, because the stator winding arrangement at all times simultaneously cooperates with all the poles. Consequently, there is an averaging which overcomes the effect of the different pole widths. In addition, only a comparatively limited asymmetry is required for producing the desired single pulse per rotation.

According to another embodiment of the invention, the pole interfaces of the exciting and control magnets are substantially linear, but are somewhat oblique-angled with respect to the rotor axis. The slope angle of one interface diverges from the substantially identical angles of the other pole interfaces. The reciprocal pole interface spacings in the central area of the exciting magnet, related to the diretion of the rotor axis, are all substantially the same. Such a magnetizing pattern can be constructed rather easily. This also makes it possible to ensure simply that the commutation with respect to the zero passage of the induced voltage is somewhat advanced in the motor winding. This improves the motor efficiency, particularly when in high-speed operation.

According to still another embodiment of the invention, the pole interface which also separates the poles of the asymmetrical pole pair is constructed in the transition area between the exciting magnet and the control magnet in a step-like or hook-like manner, more particularly with a continuous curvature.

The invention is described in greater detail hereinafter reltive to preferred embodiments and the attached drawings, wherein:

FIG. 1 is a diagrammatic section through a brushless direct current outer rotor-type motor in accordance with the invention;

FIG. 2a is a development of the motor exciting and control magnets of FIG. 1;

FIGS. 2b to 2e illustrate various signals occurring in the magnetizing pattern according to FIG. 2a;

FIG. 3 is a schematic circuit diagram of the rotation position detectors, as well as an evaluation circuit in the form of an exclusive OR circuit acting on one side and which can be used in conjunction with the motor embodiment of FIGS. 1 and 2;

FIG. 4a is a development of the exciting and control magnets that have a modified magnetizing pattern;

FIGS. 4b to 4e illustrate different signals occurring with the magnetizing pattern according to FIG. 4a; and FIG. 5 is a development of the exciting and control magnets according to another embodiment of the invention.

A brushless direct current outer rotor-type motor 10 is shown diagrammatically in FIG. 1 and has stator laminations 11 carrying a stator winding 12 which, in the illustrated embodiment, is constructed in single-strand manner. The stator plates 11, together with an annular, permanent magnetic field or exciting magnet 13, define a substantially cylindrical air gap 14 therebetween. The exciting magnet 13 can, for example, be magnetized in four circumferentially adjacent poles. This means that on the inside of the exciting magnet facing the air gap 14, two magnetic south poles alternate with two magnetic north poles. In this way, a substantially rectangular or trapezoidal magnetization is obtained circumferentially of the air gap 14. The exciting magnet 13 and an underlying permanent magnetic control magnet 18 are preferably joined as a unit and are housed on the inside of an outer or external rotor bell 16, which provides the magnetic return path. Two magnetic field-dependent rotation position detectors 20 and 21, which may be Hall generators or Hall-IC's, each provides output signals and is sensitive to the control magnet 18, the detectors being stationarily positioned substantially diametrically opposite each other facing the control magnet on a line extending through the rotor axis.

The exciting and control magnets may be rubber magnets or plastic-bonded magnets. It is also possible, however, to provide, inter alia, sintered annular magnets or shell-shaped magnet segments. In the center of the rotor bell 16 is fixed a shaft 23, supported by means of ball bearings 24 mounted in a sleeve 25. The sleeve 25 carries the stator plates 11 and is suitably secured to a stator base plate 26.

As can be seen in FIG. 2a, the exciting and control magnets 13, 18 have two pole pairs 42, 43 and 44, 45, the poles corresponding between the two magnets having the same width. The poles 44, 45 on one pole pair are of the same width, while the south pole 42 of the other pole pair 42, 43 is wider in both magnets by a predetermined amount than the associated north pole 43, as shown in exaggerated form in FIG. 2a. If the outer rotor bell 16 rotates with respect to the stationary rotation position detectors 20,21, the detector 20 gives a signal 48 according to FIG. 2b, while the detector 21 gives a signal 49 corresponding to FIG. 2c.

As shown in FIG. 3, the outputs of the rotation position detectors 20, 21 are each connected by means of a diode 50, 51, respectively, to the crosspoint 52, at which point appears a signal 53 (FIG. 2d) corresponding to the more positive of the two signals 48, 49 and representing a symmetrically commutating signal. A commutating means is schematically shown at 32 and is subject to the action of the signal 53. The base of a transistor 55 is connected across a series resistor 56 to the output of the detector 21, while the emitter of the transistor 55 is connected to the output of the detector 20. Thus, the connected transistor 55 acts as a one-sided exclusive OR circuit supplying a pulse 58 (FIG. 2e) at its output 57 only if the signal 49 is more positive than the signal 48. During each full rotation of the rotor bell 16, this condition is only fulfilled once for a time corresponding to the shortening of the pole 43. Thus, the desired control signal appears at the output 57 in the form of one pulse 58 per rotation.

The evaluation circuits according to FIGS. 7 and 9 of the aforementioned U.S. Patent can also be used without difficulty in place of the evaluation circuit according to FIG. 3 herein. To avoid unnecessary repetition, to this extent reference is made to the aforementioned U.S. Pat. No. 4,430,603.

FIG. 4a shows a development of an exciting magnet 13' and a control magnet 18', which are preferably joined as one piece. This unit has a magnetizing pattern corresponding to a modified embodiment of the invention. As shown, the pole interfaces 70, 71, 72 and 73 of the exciting and the control magnets 13', 18' are substantially linear. With respect to the direction of the rotor rotation axis, however, pole interfaces 70, 71, 72 slope in one direction, while pole interface 73 slopes in the opposite direction. Pole interfaces 70 to 73 are peripherally distributed in such a way that the reciprocal pole interface spacings are all substantially of equal dimension in the axially central area of the exciting magnet 13' (indicated at the dot-dash line 75). In respect of the magnetizing pattern formed in this way, the south pole 42' is widened in the vicinity of the control magnet 18', while at the same time the associated north pole 43' is correspondingly shortened. Signals 48', 49', 53' and 58' of FIGS. 4b to 4e correspond to the respective signal patterns of FIGS. 2b to 2e. Thus, a comparison of FIGS. 4a and 4d shows that the symmetrical commutating signal 53' advances by a certain amount with respect to the intersection point of the pole interfaces 70, 71, 72, 73 of the imaginary line 75.

In order to obtain the signal 58' in this embodiment, again the rotation position detectors 20, 21 can form part of the evaluation circuit shown in FIG. 3 or shown in FIGS. 7 and 9 of the aforementioned U.S. Patent.

FIG. 5 herein shows a third embodiment of the magnetizing pattern of the exciting and control magnets 13" and 18". The pole interface 73" separating poles 42", 43" of the asymmetrical control magnet pole pair is constructed in a step-like or hook-shaped manner, with a continuous curvature.

When the pole interface 73 slopes in the manner shown in FIG. 4a, the pole interfaces 70, 71, 72 could extend in the direction of the rotor axis. Conversely, it is possible in the instances of the pole gaps 70, 71, 72 sloping in the manner shown in FIG. 4a, to provide a pole interface 73 aligned parallel to the rotor axis. Even in this modified embodiment, the desired asymmetry is maintained in the rgion of a pole pair of the control magnet, while the pole interface in the exciting magnet region is substantially uniform.

Although the invention has been described in connection with a preferred embodiment and certain alternative embodiments other alternatives, modifications, and variations may be apparent to those skilled in the art in view of the foregoing description. Accordingly, it is intended to embrace all such alternatives, modifications, and variations as fall within the spirit and scope of the appended claims.

What is claimed:

1. A brushless direct current outer rotor motor particularly for driving magnetic storage discs, said motor having a substantially cylindrical air gap and comprising:
   an outer rotor;
   a permanent magnetic exciting magnet having at least two pairs of poles;
   a permanent magnetic control magnet having the same number of poles as said exciting magnet, both said magnets being supported on the interior of said rotor, the magnetization of said exciting magnet substantially coinciding with the magnetization of said control magnet, and a first of the pole pairs of both magnets being asymmetrical in that the pole of one magnetizing direction of said first pair is circumferentially shorter than the other pole of said first pair, all other pole pairs being symmetrical;
   two position detectors, each providing output signals and facing said control magnet and positioned stationarily substantially diametrically opposite one another on a line extending through the rotor axis, said detectors being sensitive to said control magnet; and
   an evaluation circuit responsive to the output signals of said position detectors, said evaluation circuit producing only one pulse per rotor rotation.

2. A brushless direct current outer rotor motor particularly for driving magnetic storage discs, said motor having a substantially cylindrical air gap and comprising:
   an outer rotor;
   a permanent magnetic exciting magnet having at least two pairs of poles;
   a permanent magnetic control magnet having the same number of poles as said exciting magnet, both said magnets being supported on the interior of said rotor, each pole being separated from its circumferentially adjacent pole by an interface, a first of the pole pair of said control magnet being asymmetrical in that the pole of one magnetizing direction of said first pair is circumferentially shorter than the other pole of said first pair and the other pole pairs being symmetrical, the pole interfaces of said exciting and control magnets being substantially linear, the interfaces with respect to the rotor axis being obliquely angled, the slope of all pole interfaces except a first pole interface being substantially identical to one another and the slope of said first pole interface diverging with respect to the other pole interfaces, the reciprocal spacings between said pole interfaces being substantially the same in the center, as measured in the rotor axis direction, of the exciting magnet;

two position detectors, each providing output signals and facing said control magnet and positioned stationarily substantially diametrically opposite one another on a line extending through the rotor axis, said detectors being sensitive to said control magnet; and an evaluation circuit responsive to the output signals of said position detectors, said evaluation circuit producing only one pulse per rotor rotation.

3. A brushless direct current outer rotor motor particularly for driving magnetic storage discs, said motor having a substantially cylindrical air gap and comprising:

an outer rotor;

a permanent magnetic exciting magnet having at least two pairs of poles;

a permanent magnetic control magnet having the same number of poles as said exciting magnet, both said magnets being supported on the interior of said rotor, each pole being separated from its circumferentially adjacent poles by an interface, a first of the pole pairs of said control magnet being asymmetrical in that the pole of one magnetizing direction of said first pair is circumferentially shorter than the other pole of said first pair and the other pole pairs being symmetrical, the interface between the poles of the asymmetrical pole pair being constructed in step-like or hook-shaped manner in the transition region between said exciting magnet and said control magnet;

two position detectors, each providing output signals and facing said control magnet and positioned stationarily substantially diametrically opposite one another on a line extending through the rotor axis, said detectors being sensitive to said control magnet; and an evaluation circuit responsive to the output signals of said position detectors, said evaluation circuit producing only one pulse per rotor rotation.

4. A motor according to claim 3, wherein said interface separating the poles of said asymmetrical pole pair is continuously curved in the transition region between said exciting magnet and said control magnet.

5. A motor according to claim 1 wherein said exciting and control magnets are joined as a unit.

6. A motor according to claim 2 wherein said exciting and control magnets are joined as a unit.

7. A motor according to claim 3 wherein said exciting and control magnets are joined as a unit.

8. A motor according to claim 4 wherein said exciting and control magnets are joined as a unit.

* * * * *